(12) United States Patent
Law

(10) Patent No.: US 12,337,227 B2
(45) Date of Patent: Jun. 24, 2025

(54) USING LOCATION-BASED GAME TO GENERATE LANGUAGE INFORMATION

(71) Applicant: Niantic, Inc., San Francisco, CA (US)

(72) Inventor: Herbert Law, San Jose, CA (US)

(73) Assignee: Niantic, Inc., San Francisco, CA (US)

( * ) Notice: Subject to any disclaimer, the term of this patent is extended or adjusted under 35 U.S.C. 154(b) by 241 days.

(21) Appl. No.: 18/102,506

(22) Filed: Jan. 27, 2023

(65) Prior Publication Data

US 2024/0075380 A1 Mar. 7, 2024

Related U.S. Application Data

(60) Provisional application No. 63/404,123, filed on Sep. 6, 2022.

(51) Int. Cl.
*A63F 13/216* (2014.01)
*A63F 13/63* (2014.01)
*A63F 13/655* (2014.01)
*A63F 13/79* (2014.01)
*A63F 13/80* (2014.01)

(52) U.S. Cl.
CPC ............ *A63F 13/216* (2014.09); *A63F 13/63* (2014.09); *A63F 13/655* (2014.09); *A63F 13/79* (2014.09); *A63F 13/80* (2014.09)

(58) Field of Classification Search
CPC ...... A63F 13/216; A63F 13/63; A63F 13/655; A63F 13/79; A63F 13/92
See application file for complete search history.

(56) References Cited

U.S. PATENT DOCUMENTS

| | | | | |
|---|---|---|---|---|
| 2004/0202368 A1* | 10/2004 | Lee | ........................ | G06T 7/143 382/173 |
| 2009/0133090 A1* | 5/2009 | Busse | ................ | H04N 21/4755 725/132 |
| 2010/0098291 A1* | 4/2010 | Dugan | ................. | G06V 10/507 382/101 |
| 2020/0097604 A1* | 3/2020 | Lee | ........................ | G06N 3/08 |
| 2021/0334299 A1* | 10/2021 | Sonntag | .................. | G06F 40/56 |
| 2021/0390429 A1* | 12/2021 | Chuang | ..................... | G06N 5/04 |
| 2021/0397644 A1* | 12/2021 | DeLuca | ................ | G10L 15/005 |
| 2022/0300764 A1* | 9/2022 | Liu | ....................... | G06F 18/2148 |
| 2022/0319219 A1* | 10/2022 | Tsibulevskiy | ........... | G06F 18/40 |
| 2022/0375025 A1* | 11/2022 | Ardö | ...................... | G06V 10/20 |

* cited by examiner

*Primary Examiner* — James S. McClellan
(74) *Attorney, Agent, or Firm* — Fenwick & West LLP

(57) ABSTRACT

A location-based game may include language learning features to help a player learn a foreign language. To generate these features, the game may generate language information by allowing players to play language gathering games. For example, a virtual character can use a native language of a player to instruct the player to identify an object in an environment. The player may then identify the object in the environment. The player may also speak the name of the identified object. The name of the object, a recording of the player speaking the name, and pixel values representing the object may be associated together. By gathering this information across different languages, a database can be formed that includes language information for many objects. This language information may then be used to generate language learning features.

20 Claims, 9 Drawing Sheets

USING LOCATION-BASED GAME TO GENERATE LANGUAGE INFORMATION

CROSS-REFERENCE TO RELATED APPLICATION

This application claims priority to U.S. Provisional Patent Application Ser. No. 63/404,123, "Using Location-Based Game to Generate Language Information," filed on Sep. 6, 2022, which is incorporated herein by reference in its entirety.

BACKGROUND

1. Technical Field

The subject matter described relates generally to location-based games, and, in particular, to using location-based games to generate language information via language gathering games.

2. Problem

Players may enjoy learning a foreign language while playing a game, however it may be difficult to for game developers to add language learning features to a game without significant amounts of language data.

SUMMARY

A location-based game may include language learning features to help a player learn a foreign language ("player" and "user" are used synonymously herein). For example, a virtual character can ask a player to identify the name of an object in an environment using a foreign language. The player may then identify the name of the object (e.g., via text or speaking) using the foreign language, thus helping the player to better understand the foreign language.

To generate these language learning features, the game may generate language information by allowing players speaking various languages to play language gathering games that are part of the location-based game. For example, a virtual character can use a native language of a player to instruct the player to identify an object in an environment. The player may then identify the object in the environment (e.g., using their client device to capture an image of the object). The player may also speak the name of the identified object. The name of the object, a recording of the player speaking the name, and pixel values representing the object may be associated together and stored (in accordance with user permissions). Additional information (also in accordance with user permissions) may be part of the association, such as the player's native language, accent, dialect, age, and gender. By gathering this information across different languages, a database can be formed that includes language information for many objects. This language information may then be used to generate language learning features. Some embodiments herein relate to generating language information via language gathering games.

In one embodiment, an object type is selected. A language setting of a user profile associated with a client device is determined. An indication of the object type is provided for presentation. The indication of the object type is provided in a language of the language setting. A view of an environment at a location of the client device is provided for display. The view of the environment includes an object. An indication is received from a user of the client device that indicates the object in the view of environment is of the object type. Pixel values of the view of the environment representing the object are identified based on the indication that the object is of the object type. An association is created between the indication of the object type and the pixel values representing the object.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where language data gathering is desirable. In addition, the inherent flexibility of computer-based systems allows for a great variety of possible configurations, combinations, and divisions of tasks and functionality between and among the components of the system.

Example Location-Based Parallel Reality Game

Figure 1:
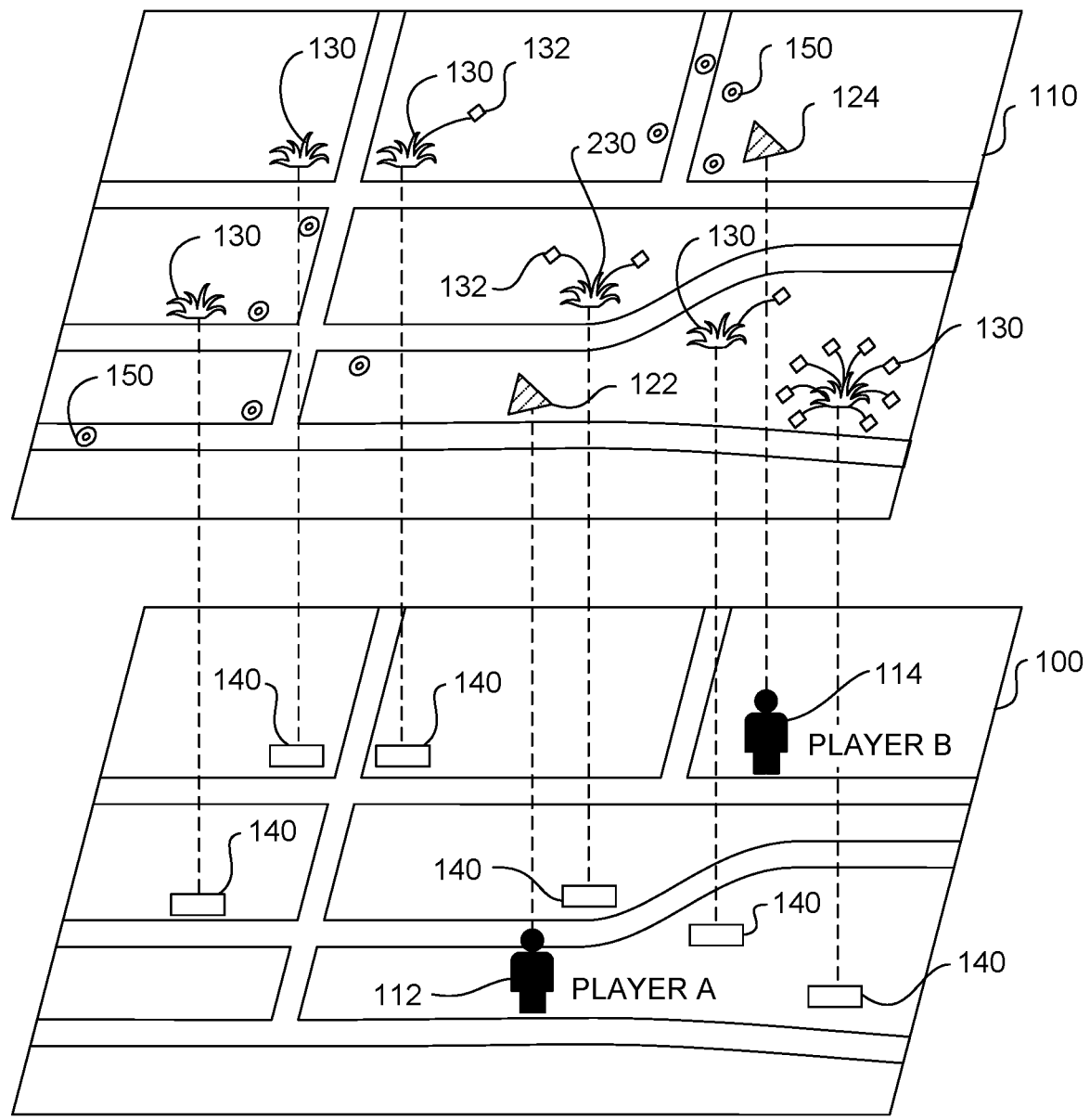
FIG. 1 depicts a representation of a virtual world having a geography that parallels the real world, according to some embodiments.

FIG. 1 is a conceptual diagram of a virtual world 110 that parallels the real world 100. The virtual world 110 can act as the game board for players of a parallel reality game ("user" and "player" are used synonymously herein). As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A 112 may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
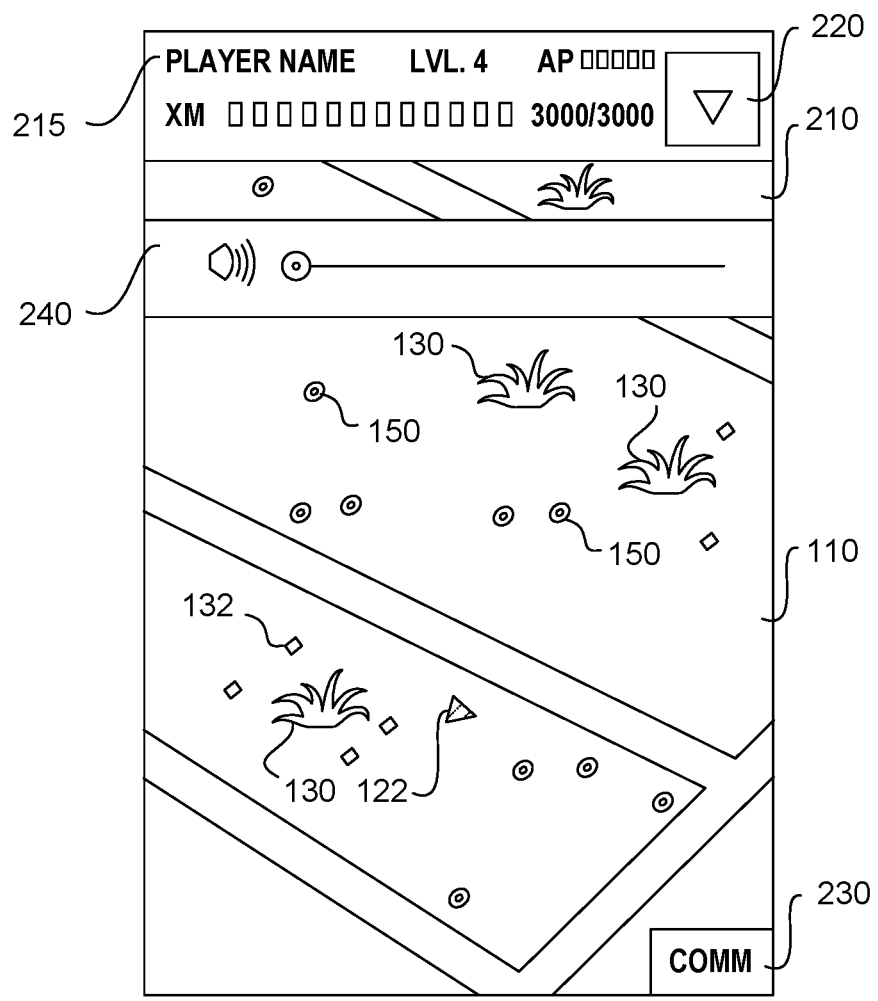
FIG. 2 depicts an exemplary game interface of a parallel reality game, according to some embodiments.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device 110 around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
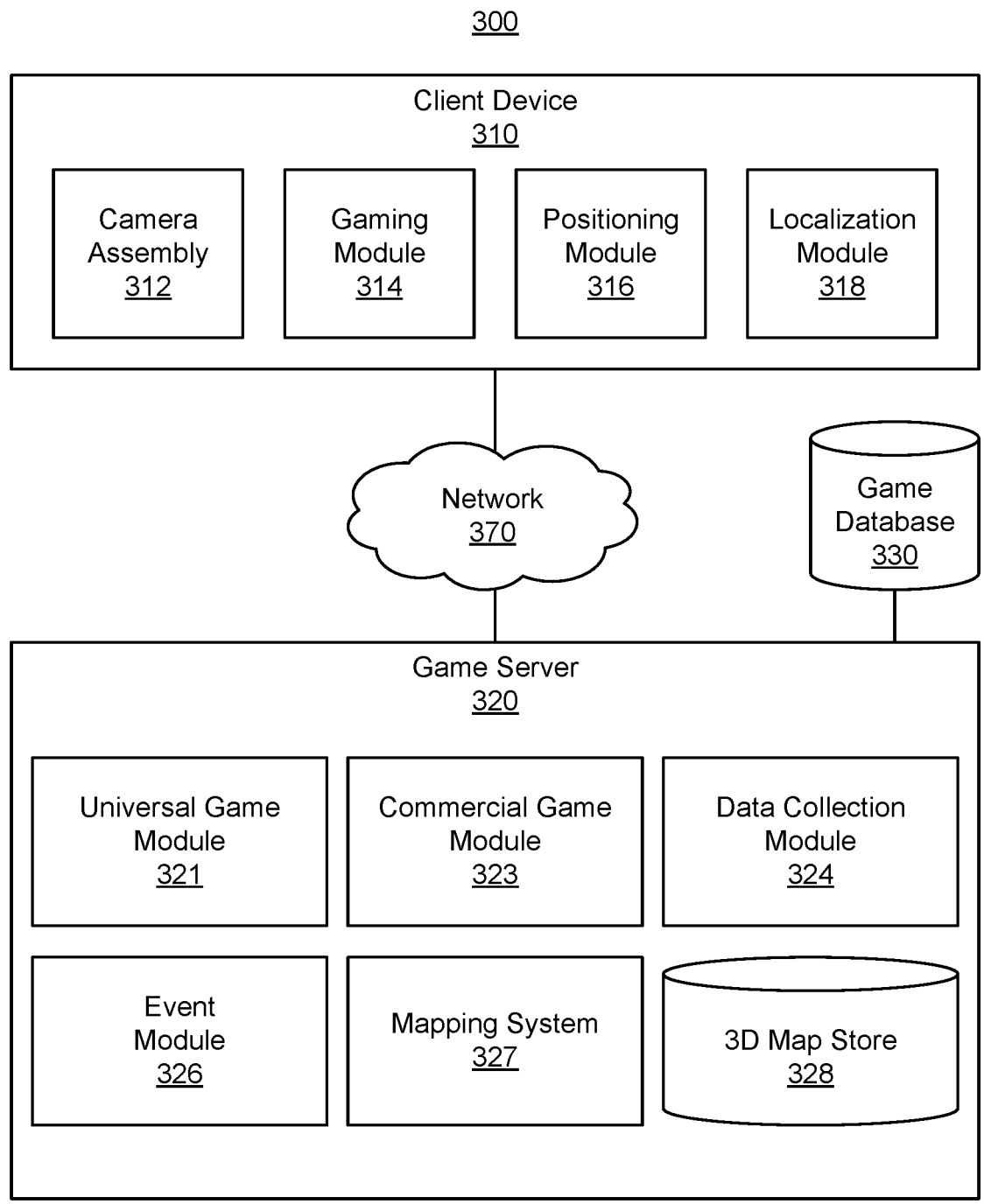
FIG. 3 is a block diagram of a networked computing environment suitable for using a location-based game to generate language information, according to some embodiments.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 110 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 (also referred to as the game module 314) provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 receives the location determined for the client device 310 by the positioning module 316 and refines it by determining a pose of one or more cameras of the camera assembly 312. In one embodiment, the localization module 318 uses the location generated by the positioning module 316 to select a 3D map of the environment surrounding the client device 310. The localization module 318 may obtain the 3D map from local storage or from the game server 320. The 3D map may be a point cloud, mesh, or any other suitable 3D representation of the environment surrounding the client device 310.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dad reckoning based on sensor readings, periodic re-localization, or a combination of both. Having an accurate pose for the client device 310 may enable the game module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 330. The game database 330 stores game data used in the parallel reality game to be served or provided to the client device 320 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences (e.g., language preferences), team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players) of the system 300, such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal gaming module 322, a commercial game module 323, a data collection module 324, an event module 326, a mapping system 327, and a 3D map 328. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze and data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 328. The 3D map may be stored in the 3D map store 328 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Methods

Figure 4:
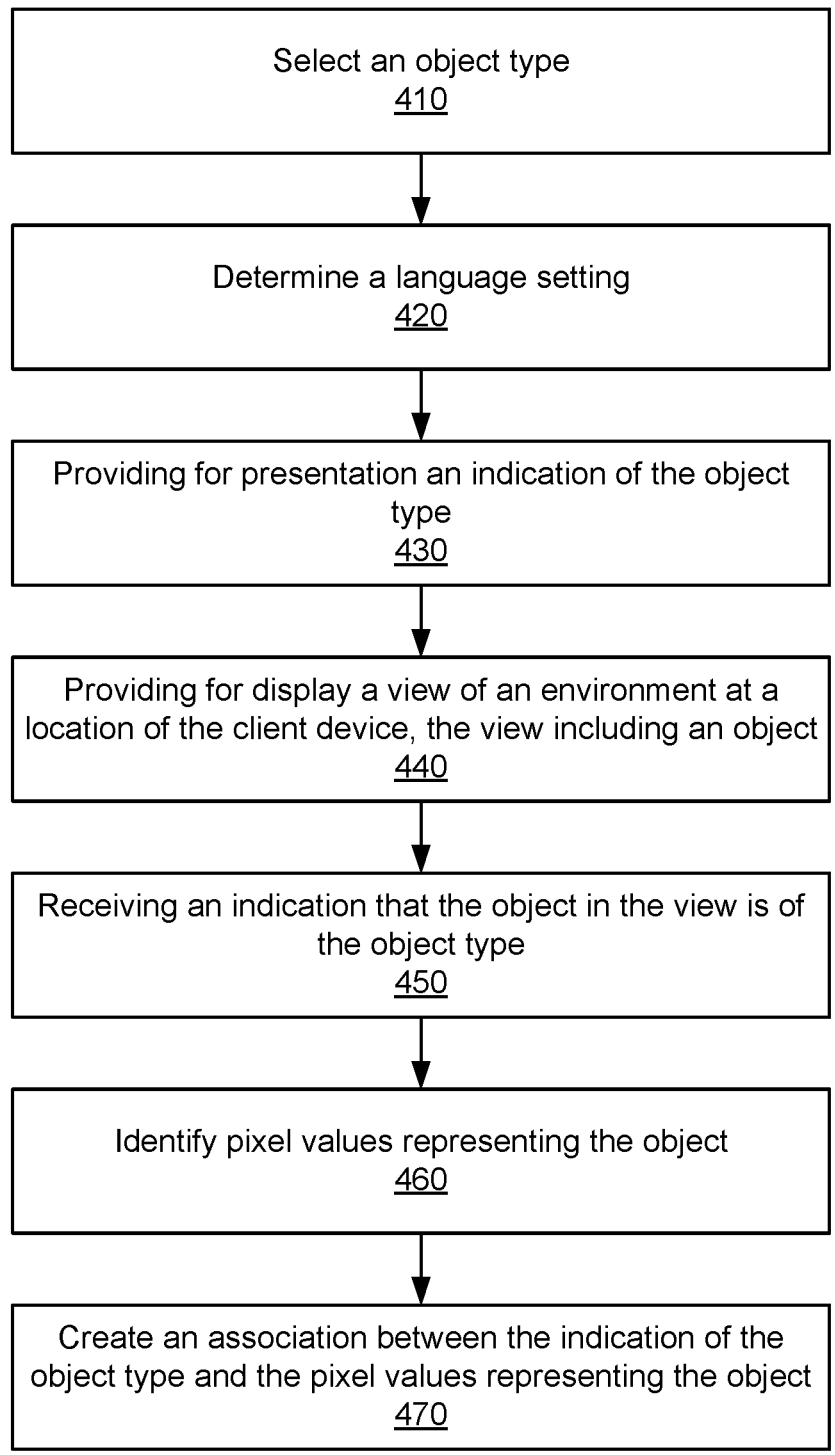
FIG. 4 is a flowchart of a process for gathering language information, according to some embodiments.

FIG. 4 is a flowchart describing an example method 400 of gathering language information, according to some embodiments. The steps of FIG. 4 are illustrated from the perspective of a game module (e.g., 314) of a client device (e.g., 310) performing the method 400. However, some or all of the steps may be performed by other entities or components. In addition, some embodiments may perform the steps in parallel, perform the steps in different orders, or perform different steps. One or more steps of the method 400 may be stored as instructions in a non-transitory computer-readable storage medium.

In the embodiment shown, the method 400 begins with the game module selecting 410 an object type. As used herein, an object type is a type, category, or descriptor of an object (or multiple objects) in the real world or in a virtual world. For example, "bird" may be an object type of a pigeon. In another example, "ball" may be an object type of a basketball. In some cases, an object type is a name of an object (e.g., basketball or hamburger). In some cases, an object type refers to a shape, color, or texture of an object (e.g., sphere or blue).

To select an object type, the game module may use one or more (e.g., AR) semantic segmentation algorithms to identify object types in one or more images captured by a camera assembly (e.g., 312). An object type from the identified object types may then be selected. An object type is selected based on one or more criteria, such as interests of the user or confidence scores of the semantic segmentation algorithms. If none of the identified object types satisfy the one or more criteria (or no object types are identified), the game module may provide an instruction to the user to adjust the client device, such as moving the client device, zooming in, zooming out etc. In some embodiments, the user selects the object type, for example, by providing input (e.g., a voice or touch selection) to a client device indicating an object type the user determines is in the environment.

The game module determines 420 a language setting of a user profile associated with the client device. For example, the game module receives the language setting from a user profile stored on a game database (e.g., 330) via a network (e.g., 370). The language setting specifies a language the user speaks (e.g., their native language) or a language the users wants the location-based game to use (e.g., display) when the user plays the game.

The game module provides 430 for presentation an indication of the object type. For example, the indication of the object type is provided to a display of the client device. The indication of the object type may be text, an image, a video, or an audio clip. The indication of the object type may be provided in a language of the language setting (e.g., to increase the likelihood of the user understanding what the object type is). Example indications of object types are illustrated and described with respect to FIGS. 5A-5D (e.g., in the text region 505 and image region 510).

The game module provides 440 for display a view of an environment at a location of the client device. The view may be provided to a display of the client device. The view of the environment may be a view captured by a camera assembly (e.g., 312) of the client device. The view of the environment includes an object (e.g., of the object type). For example, responsive to the user understanding indication of the object type, the user orients the client device so that an object of the object type is in a field of view of the camera assembly. To give a more specific example, if the client device displays the text 'sphere,' the user may look for an object in the real world that is spherical in shape (e.g., a baseball) and orientate the client device toward the spherical object. Example views of an environment are illustrated and described with respect to FIGS. 5A-5D (e.g., in the camera image region 520).

The game module receives 550 an indication that the object in the view of the environment is of the object type. For example, the user instructs the client device to capture an image of the object in the environment. In another example, the user selects the object in the displayed view of the environment. In another example, the user speaks a command to indicate that the object in the view of the environment is of the object type.

In some embodiments, the game module may receive audio data (e.g., from an audio sensor) of the user speaking the object type of the object. For example, the audio sensor records the user speaking the name of the object in the view of the environment. In some embodiments, the audio data is the indication that the object is of the object type.

The game module identifies 560 pixel values of the view of the environment representing the object based on the indication. For example, an object recognition model (e.g., a semantic segmentation module) may be used to identify the pixel values corresponding to the object. As further described with respect to FIG. 5D, and outline of the object may be sent for display to help identify the pixel values.

The game module creates 570 an association between the indication of the object type and the pixel values representing the object. If the game module receives audio data the user speaking the object type, the game module may also associate the audio data with the indication of the object type and the pixel values. If multiple indications of the object type are provided for presentation at step 530 (e.g., text and an image), the game module may create and association between the multiple indications of the object type and the pixel values representing the object (e.g., associations between text, an image, and pixel values representing the object).

The association may be stored in a game database (e.g., 330). The method 400 may be performed multiple times (e.g., for different object types) and for multiple users speaking different languages to building up language data of the game database. For example, the game database includes a first association for "basketball" generated by a first user that includes: a segmented image of a basketball (e.g., captured by the user), a recording of the user speaking "basketball" in English, and information about the user, such as the user spoke in English with an American accent, is an adult male aged 20-30 years of age, and lives in the USA. The game database may also include a second association for "basketball" generated by a second user that includes: a second segmented image of a basketball (e.g., captured by the second user), a recording of the second user speaking "basketball" in Japanese and information about the second user, such as the second user spoke in Japanese with a Kansai dialect, is an adult female aged 30-40 years of age, and lives in the Japan. In some embodiments, each association is added as a graph object to a relational graph that maintains the associations in the game database. By gathering this language information across different languages, a database can be formed that includes language information for many objects. This language information may then be used to generate language learning features of the location-based game.

Example Game Interfaces

Figure 5A:
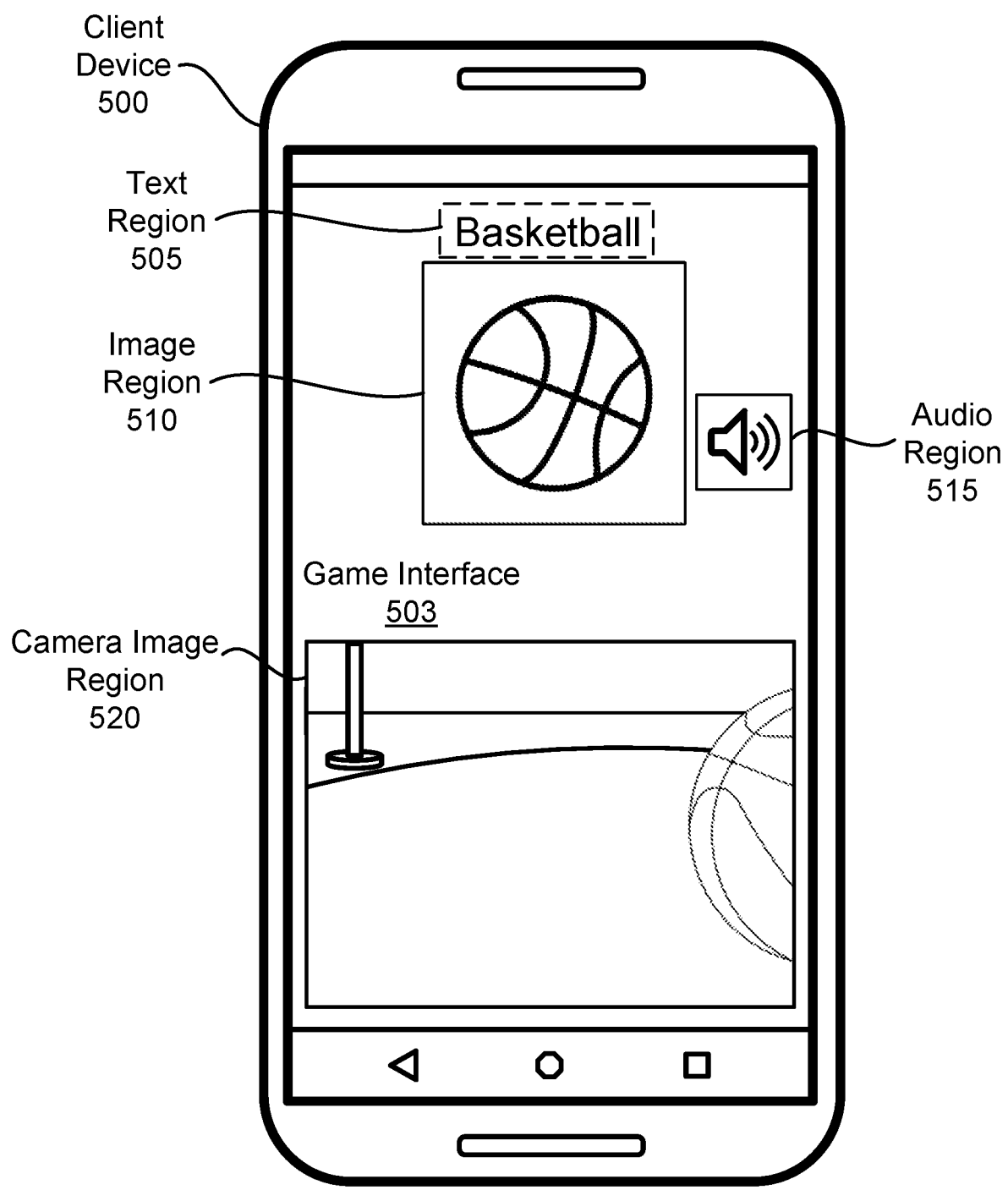
FIG. 5A is an image of a client device displaying a game interface with English text, according to some embodiments.

FIG. 5A is an image of a client device 500 displaying a game interface 503, according to some embodiments. Client device 500 may be an embodiment of client device 310. The game interface 503 may be for a language gathering game (of a location-based game) played by the user. The user playing the game may result in the game acquiring language processing data (pending user permissions). In the example of FIG. 5A, the game interface 503 includes a text region 505, an image region 510, an audio region 515, and a camera image region 520, however the interface 503 may include additional, fewer, or different features.

Figure 5B:
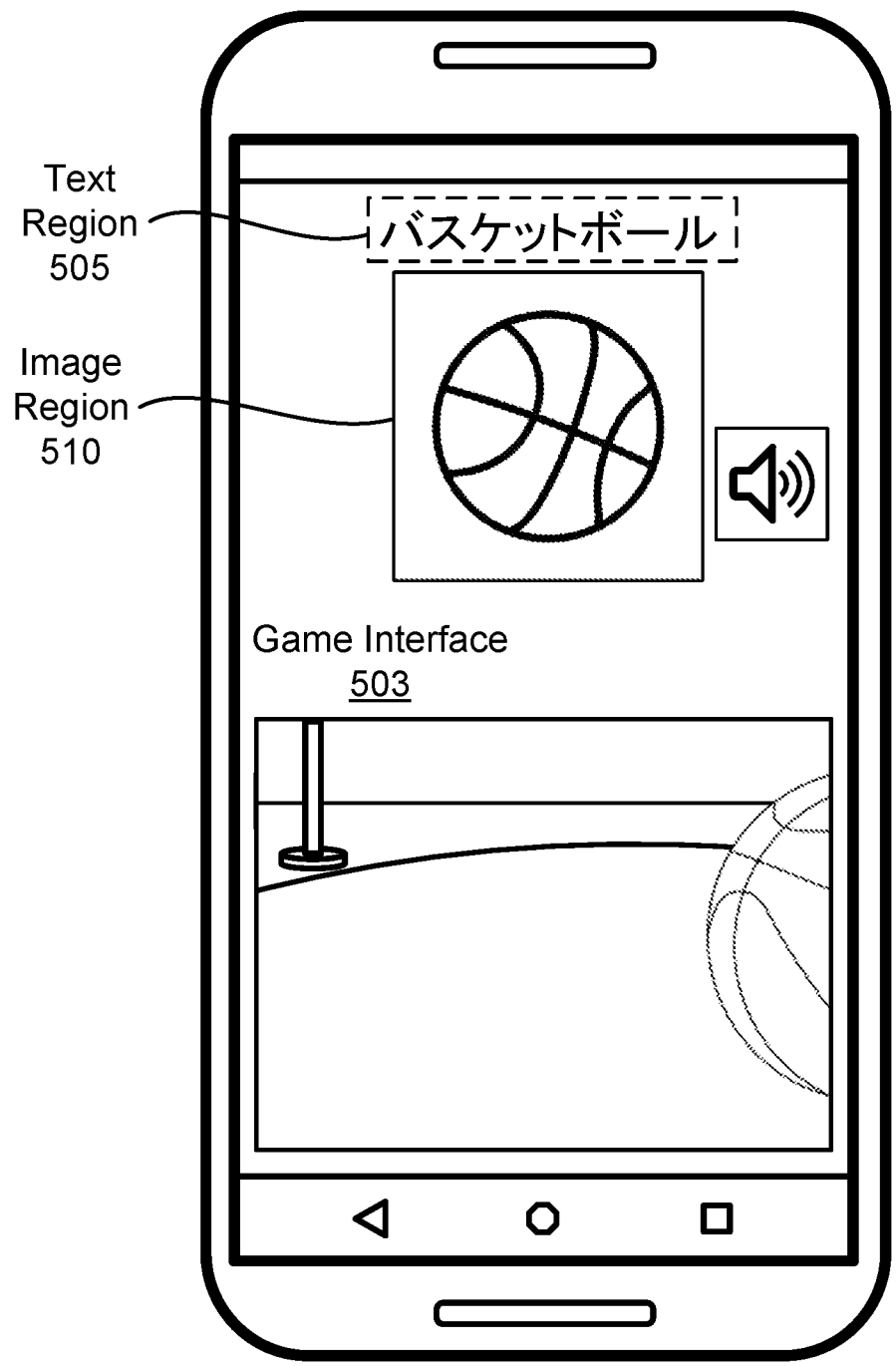
FIG. 5B is an image of a client device displaying a game interface with Japanese text, according to some embodiments.

The text region 505 displays text of an object type (displaying text of an object type is an example of the client device 500 presenting an indication of an object type). In the example of FIG. 5A, the text region 505 displays the word "Basketball." The text may correspond to an image in the image region 510 or audio played by the client device 500 (e.g., the object type of the text is the same as the object type of the image or the audio). The text is intended to communicate the object type to the user (e.g., the text is the name of an object). Thus, the language of the text may be in a language the user understands. For example, the language is selected based on a language setting in a profile of the user or based on a language commonly spoken at the location of the client device 500 in the real world. FIG. 5B illustrates an example where the text region 505 displays text in Japanese (the text translates to "Basketball"). For example, the user profile indicates that the user speaks Japanese, or the client device is in Japan.

Referring back to FIG. 5A, the image region 510 displays an image of an object type (displaying an image of an object type is an example of the client device 500 presenting an indication of an object type). The image is intended to communicate the object type to the user. In the example of FIG. 5A, the image is a diagram of a basketball. More than one image of the object type may be displayed in the image region 510. The image in the image region 510 may correspond to text in the text region 505 or audio played by the client device 500 (e.g., the object type of the image is the same as the object type of the text or the audio).

The audio region 515 is an interactable region (e.g., button) of the interface 503. By interacting with (e.g., selecting) the audio region 515, the client device 500 outputs audio of an object type (emitting audio of an object type is an example of the client device 500 presenting an indication of an object type). In the example context of FIG. 5A, the audio may be an audio clip of someone speaking the word "basketball." The audio is intended to communicate the object type to the user. Thus, the language used in the audio may be a language the user understands. As stated above, the language may be based on a language setting or based on a language spoken at the location of the client device 500. The audio may correspond to text in the text region 505 or the image in the image region 510 (e.g., the object type of the audio is the same or similar as the object type of the image region 510 or the text region 505). In some embodiments, the client device 500 may automatically emit the audio (e.g., without the interface 503 including an audio region 515).

A game interface (e.g., 503) is not required to include a text region (e.g., 505), an image region (e.g., 510), and an audio region 515. For example, a game interface may include a text region but not an image region or an audio region. In some embodiments, an interface doesn't include any of these regions. In these embodiments, the client device 500 may just emit audio of object type.

The camera image region 520 displays an image of a view of an environment at the location of the client device 500. The image of the view of an environment may be based on images captured by a camera assembly (e.g., 312) of the client device 500. For example, the region 520 displays a real time video captured by the camera assembly. The environment may be of the real world or of a virtual world. In some embodiments, the environment is of the real world, but the displayed image includes virtual objects that appear to be in the environment (a virtual object may be displayed in conjunction with a view of the real world environment). In these embodiments, a virtual object may be an object of an object type.

While playing a language gathering game, the user may capture an image of an object of an object type. Thus, by presenting an indication of an object type (e.g., an image in the image region 510) a user may search their environment for an object of the object type. After the user finds an object, they may orient the client device 500 so that the object is in a field of view of the camera assembly. Then, the user may instruct the client device 500 to capture an image of the environment that includes object. The user may also indicate that the captured image includes an object of the object type (e.g., by selecting one of the buttons at the bottom of the interface 503). Based on this indication, pixels values representing the object may be identified and stored. In some embodiments, the user may indicate the location of the object in the captured image. An outline of the object may be displayed to confirm the object of the object type. Additionally, or alternatively, the user may speak (or pronounce) the object type (e.g., speaking the text displayed in the text region 505) and the client device 500 may record the user speaking the object type (e.g., via an audio sensor). Afterwards, the game interface 503 may present an indication of another object type for the user to pursue.

Figure 5C:
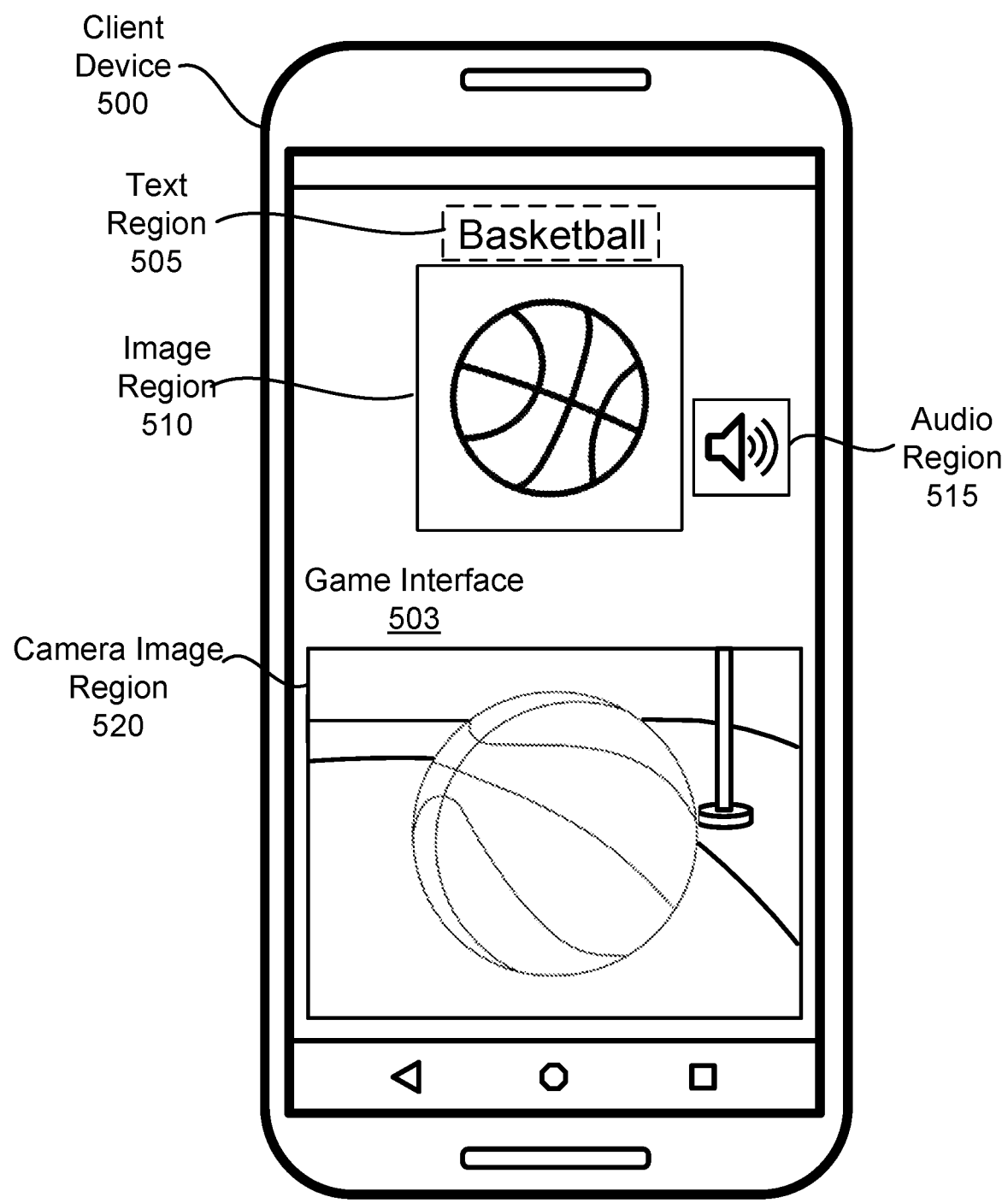
FIG. 5C is an image of a client device displaying a game interface with an image of a basketball in a camera image region, according to some embodiments.
Figure 5D:
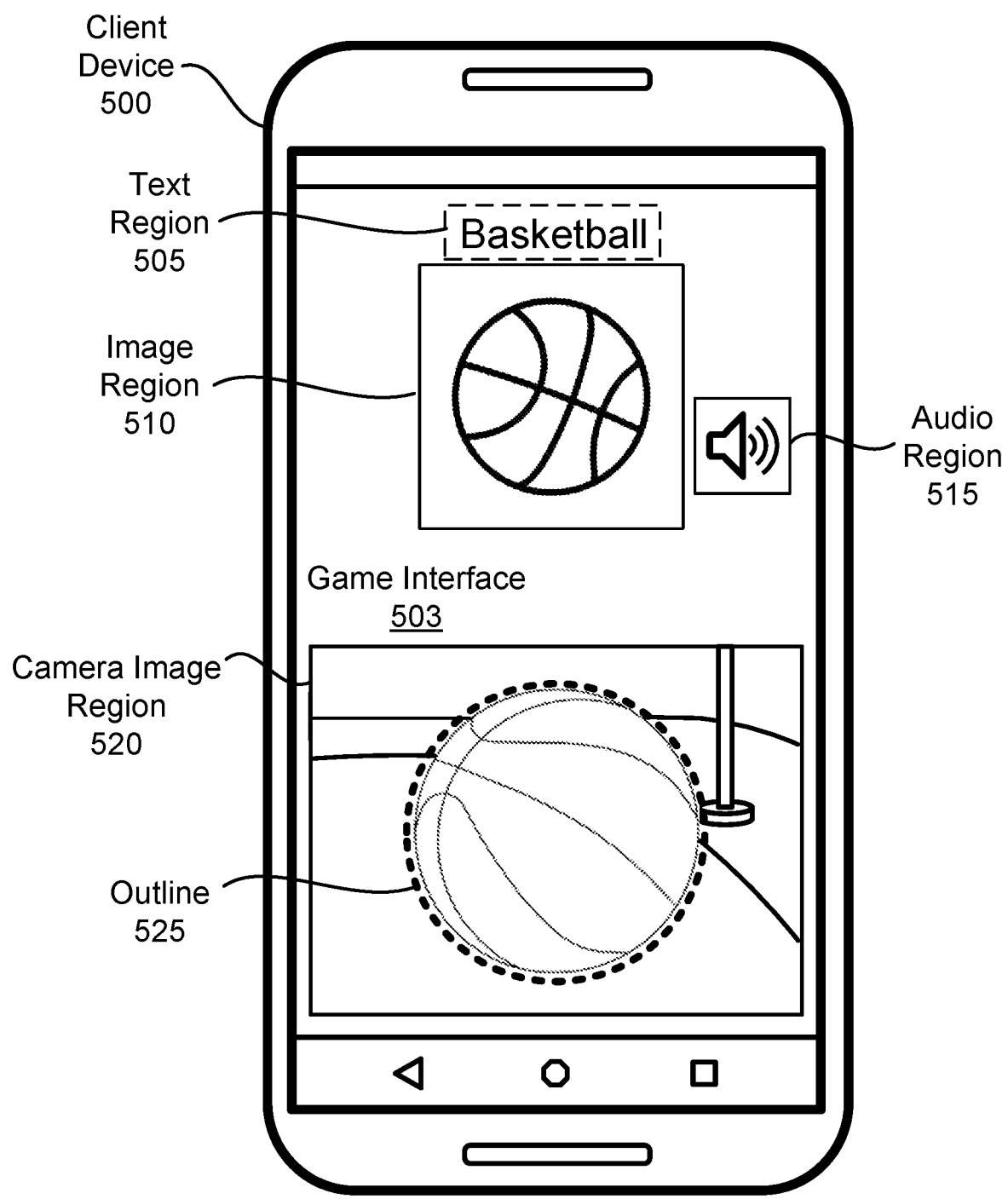
FIG. 5D is an image of a client device displaying a game interface with an outline of a basketball in a camera image region, according to some embodiments.

An example of this gameplay is illustrated in FIGS. 5A, 5C, and 5D. In FIG. 5A, the image region 510 displays an image of a basketball, indicating that the user should capture an image of a basketball in their environment. Responsive to seeing the image of the basketball, the user may orient the client device 500 toward a basketball in the environment, using the camera image region 520 as a guide. In FIG. 5A, the client device 500 is not oriented toward a basketball, but the image in the camera image region 520 indicates a basketball is nearby. In FIG. 5C, the user has changed the orientation of the client device 500 so that the basketball is displayed in the center of the camera image region 520 (e.g., the basketball is in the field of view of the camera assembly). The user may then indicate that a basketball is displayed in the camera image region 520, for example, by selecting the basketball in the region 520.

In some embodiments, an outline of the basketball (or a highlight of the basketball in a different color shade) may be displayed in the camera image region 520 (e.g., responsive to the user indicating the basketball). The basketball may be identified using an object recognition model (e.g., a semantic segmentation model). An example outline 525 is illustrated in FIG. 5C. In some embodiments, the interface 503 allows the user to indicate whether the outline 525 is correctly outlining the object or not. If not, the user may be able to adjust the position or shape of the outline 525. The outline 525 may help (e.g., the game module 314) identify pixel values of the captured image that represent the basketball.

To encourage the user to play the game, the user may receive virtual rewards for performing various tasks, such as orienting the client device 500 so that a camera assembly captures an image of an object of an object type. Additionally, or alternatively, a virtual character may encourage a user to play the game. For example, a virtual pet (e.g., displayed in the camera image region 520) tells the user "I like to play basketball. Can you show me a basketball?" (this audio is another example of the client device presenting an indication of an object type). In some embodiments, a virtual character may appear to interact with an object identified by the user (e.g., the character appears to sit on the object).

Example Game Language Learning Features

The gathered language data described above may be used to add language features to the location-based game (e.g., to help users learn foreign languages while they play the location-based game). Several example features are described below:

(A) In a first example, the language data is used to train a model (e.g., natural language processing model) to talk in a specific language. The model may be more nuanced than merely speaking the language though. For example, using the object type associations, the model may be trained to speak a certain accent or dialect of the language. Additionally, or alternatively, the model may be trained to speak like a person of a certain age range or a person of a certain gender. After the model is trained, the model may be used to generate dialogue for uses in the location-based game (e.g., for a virtual character of the location-based game).

(B) In another example, if a user submits a threshold amount of language data, a model (e.g., natural language processing model) may be trained to talk in the same style (e.g., accent or speech pattern) as the user. The model may be used to generate dialogue. For example, if a celebrity submits the threshold amount of language data, a virtual character of the location-based game (e.g., a virtual character of the celebrity) may speak like the celebrity. Thus, other users of the location-based game can enjoy interacting with a virtual character that speaks like the celebrity. In another example, a first user may submit the threshold amount of language data and may request the location-based game to generate a virtual character (e.g., pet) that speaks like the first user. The first user may then send the virtual character to a second user who is a friend. Thus, the second user can enjoy interacting with a virtual character that speaks like their friend (the first user).

(C) In another example, the language data may be used to train an object recognition model (e.g., using the pixel values stored in the object type associations). This model may be used to enable the location-based game (e.g., virtual characters of the game) to identify objects in the real world. For example, a virtual character (e.g., pet) may appear to identify a basketball in the real world, speak "basketball," and appear to interact with the basketball.

(D) In another example, the location-based game provides vocabulary teaching games. For example, a game interface may present an indication of an object type in a foreign language that a user wants to learn. Responsive to this, the user may try to understand the object type and perform an activity. For example, a virtual character displayed in a game interface can instruct (in the foreign language) the user to identify an object in an environment. Using their understanding of the foreign language, the user may then identify the object in the environment (e.g., using their client device to capture an image of the object). The user may also speak the name of the identified object in the foreign language. Thus, this game may help a user practice the foreign language. Another example game can be understood by looking at FIG. 5B and assuming the user of the client device is an English speaker that wants to learn Japanese. In this situation, the user may see the text region, determine the text means "basketball" (e.g., by looking at the image region 510) and then capturing an image of a basketball in their environment. Note that since the text region 505 is displaying a foreign language the user wants to learn (Japanese), this is an example of the client device displaying text that is different than the language setting of the user profile (English). The user may also be instructed to pronounce the text in the text region 505. After the user pronounces the text, the user may receive a score or rewards based on how proper the pronunciation is. The correctness of the user's pronunciation may be determined by a language matching model trained using audio clips of native speakers from the gathered language data. In some embodiments, advertisements may be part of a vocabulary teaching game. For example, a basketball language screen can show a nearby basketball game ticket advertisement. In another example, a hamburger language screen can show a nearby McDonald's meal advertisement.

(E) In addition to the uses described above, there are may other possible uses of the language data. For example, the language data may be used to perform translation services (e.g., for voice and text data). In another example, a model may be trained to recognize a user's voice.

Example Computing System

Figure 6:
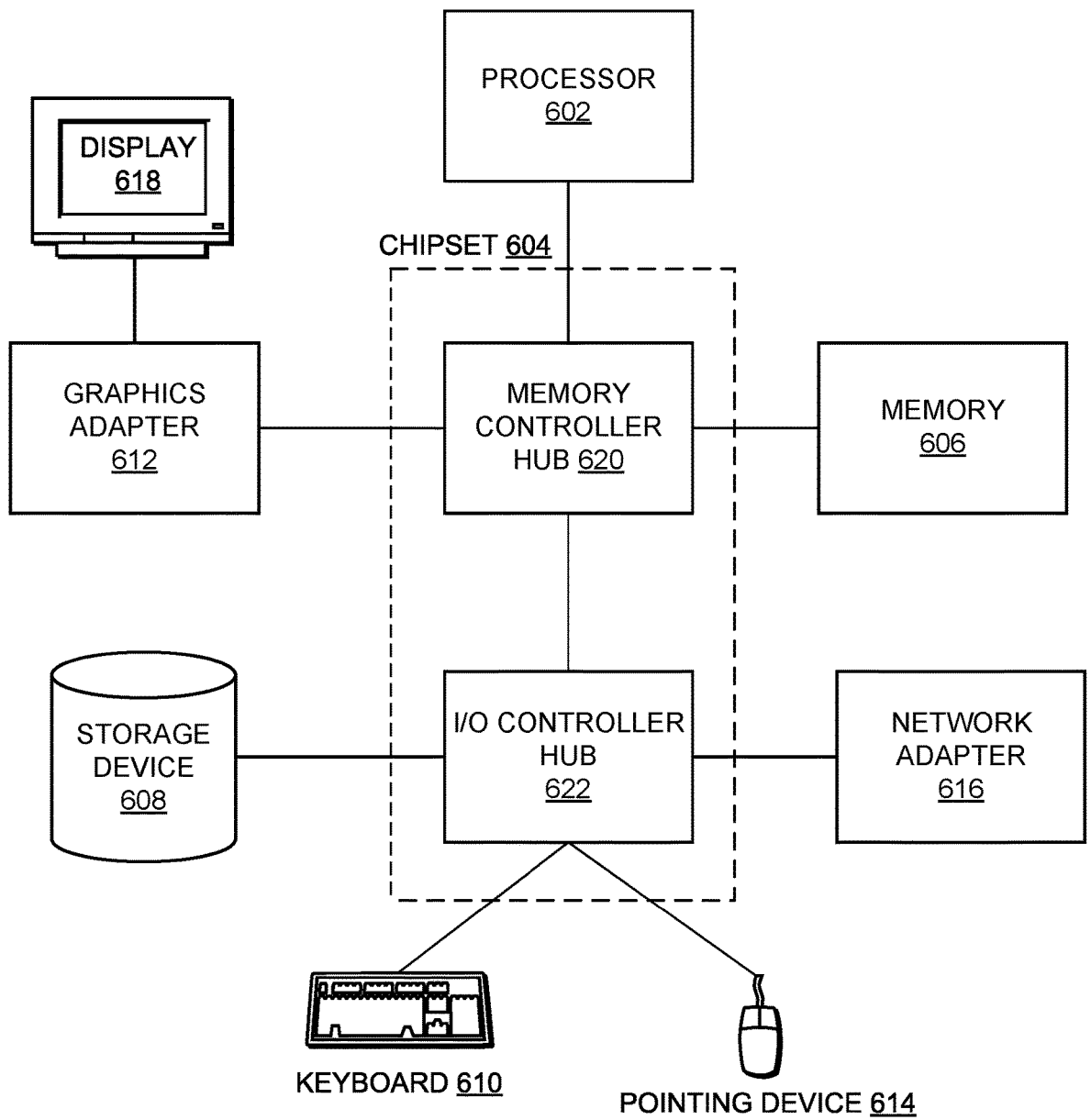
FIG. 6 illustrates an example computer system suitable for use in the networked computing environment of FIG. 1, according to one embodiment.

FIG. 6 is a block diagram of an example computer 600 suitable for use as a client device 310 or game server 320. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and may be used in combination with the keyboard 610 (which may be an on-screen keyboard) to input data into the computer system 600. The graphics adapter 612 displays images and other information on the display 618. The network adapter 616 couples the computer system 600 to one or more computer networks, such as network 370.

The types of computers used by the entities of FIG. 3 can vary depending upon the embodiment and the processing power required by the entity. For example, the game server 320 might include multiple blade servers working together to provide the functionality described. Furthermore, the computers can lack some of the components described above, such as keyboards 610, graphics adapters 612, and displays 618.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A non-transitory computer-readable storage medium comprising stored instructions for providing a location-based game, the instructions, when executed by a client device, causing the client device to perform operations including:
   selecting an object type;
   determining a language setting of a user profile associated with the client device;
   providing for presentation an indication of the object type, the indication of the object type provided in a language of the language setting;
   providing for display a view of an environment at a location of the client device, the view of the environment including an object;
   receiving an indication by a user of the client device that the object in the view of the environment is of the object type;
   identifying pixel values of the view of the environment representing the object based on the indication that the object is of the object type; and
   creating an association between the indication of the object type and the pixel values representing the object.

2. The non-transitory computer-readable storage medium of claim 1:
   wherein providing for presentation the indication of the object type comprises providing text for display, the text provided in the language of the language setting; and
   wherein the indication that the object of the object type is an indication that the text is a name of the object in the environment.

3. The non-transitory computer-readable storage medium of claim 1, wherein the operations further include:
   receiving an image captured by a camera assembly of the client device, wherein the view of the environment including the object is based on the captured image.

4. The non-transitory computer-readable storage medium of claim 1, wherein the object is a real-world object in the environment.

5. The non-transitory computer-readable storage medium of claim 1, wherein the object is a virtual object that is displayed by the client device in conjunction with the view of the environment.

6. The non-transitory computer-readable storage medium of claim 1, wherein the operations further include: receiving audio data, from an audio sensor, of the user speaking the object type of the object.

7. The non-transitory computer-readable storage medium of claim 6, wherein creating the association between the indication of the object type and the pixel values representing the object comprises creating an association between the audio data, the indication of the object type, and the pixel values representing the object.

8. The non-transitory computer-readable storage medium of claim 6, wherein the audio data is of the user speaking the object type of the object in the language of the language setting.

9. The non-transitory computer-readable storage medium of claim 6, wherein the audio data is of the user speaking the object type of the object in a language different than the language of the language setting.

10. The non-transitory computer-readable storage medium of claim 1, wherein the association is stored in a graph object.

11. The non-transitory computer-readable storage medium of claim 1, wherein receiving the indication that the object is of the object type includes the user selecting the object in the view of the environment.

12. The non-transitory computer-readable storage medium of claim 1, wherein the operations further include sending for display an outline of the object in the view of the environment.

13. The non-transitory computer-readable storage medium of claim 1, wherein the view of the environment is provided for display in conjunction with the indication of the object type.

14. The non-transitory computer-readable storage medium of claim 1, wherein the operations further include: determining the location of the client device, wherein the indication of the object type is provided in the language further according to the location of the client device.

15. A method comprising:
selecting an object type;
determining a language setting of a user profile associated with a client device;
providing for presentation an indication of the object type, the indication of the object type provided in a language of the language setting;
providing for display a view of an environment at a location of the client device, the view of the environment including an object;
receiving an indication by a user of the client device that the object in the view of the environment is of the object type;
identifying pixel values of the view of the environment representing the object based on the indication that the object is of the object type; and
creating an association between the indication of the object type and the pixel values representing the object.

16. The method of claim 15:
wherein providing for presentation the indication of the object type comprises providing text for display, the text provided in the language of the language setting; and
wherein the indication that the object of the object type is an indication that the text is a name of the object in the environment.

17. The method of claim 15, further comprising:
receiving an image captured by a camera assembly of the client device, wherein the view of the environment including the object is based on the captured image.

18. The method of claim 15, further comprising: receiving audio data, from an audio sensor, of the user speaking the object type of the object.

19. The method of claim 18, wherein:
creating the association between the indication of the object type and the pixel values representing the object comprises creating an association between the audio data, the indication of the object type, and the pixel values representing the object; and
the audio data is of the user speaking the object type of the object in a language different than the language of the language setting.

20. The method of claim 15, further comprising sending for display an outline of the object in the view of the environment.

* * * * *